5 Sheets—Sheet 1.
A. M. HOWARD.
TYPE MACHINE.
No. 187,278.  Patented Feb. 13, 1877.
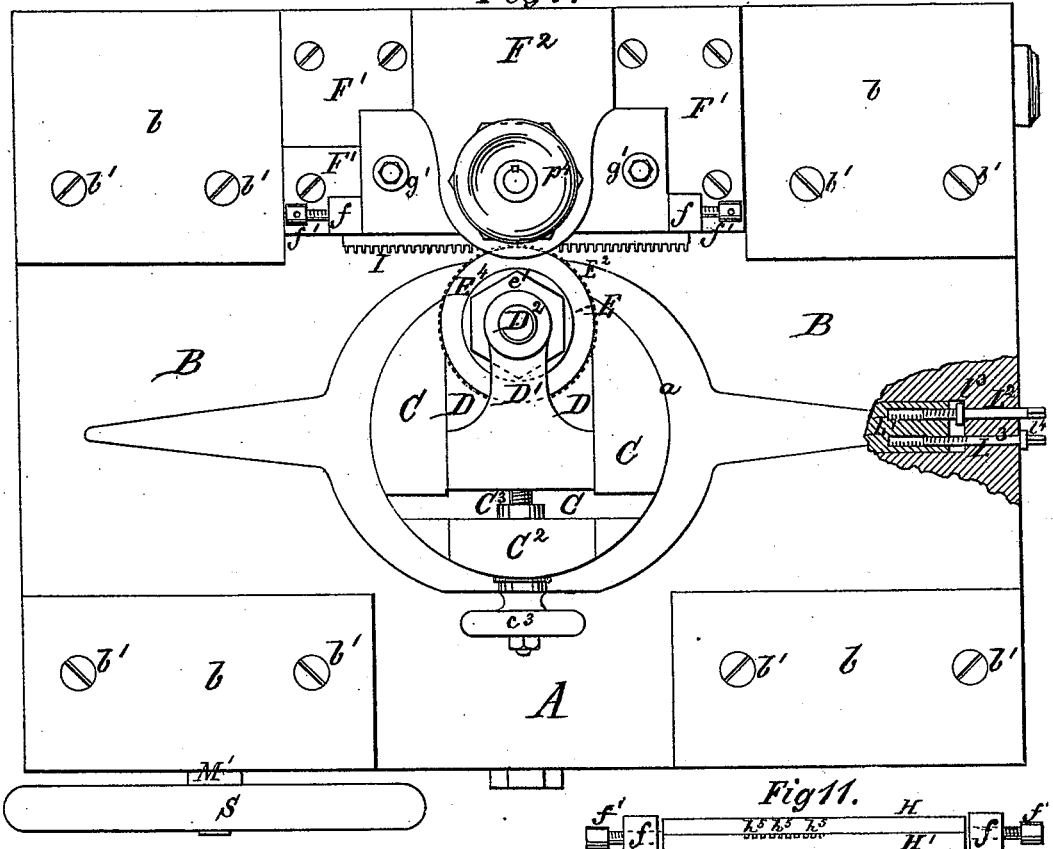

A. M. HOWARD.
TYPE MACHINE.
No. 187,278. Patented Feb. 13, 1877.
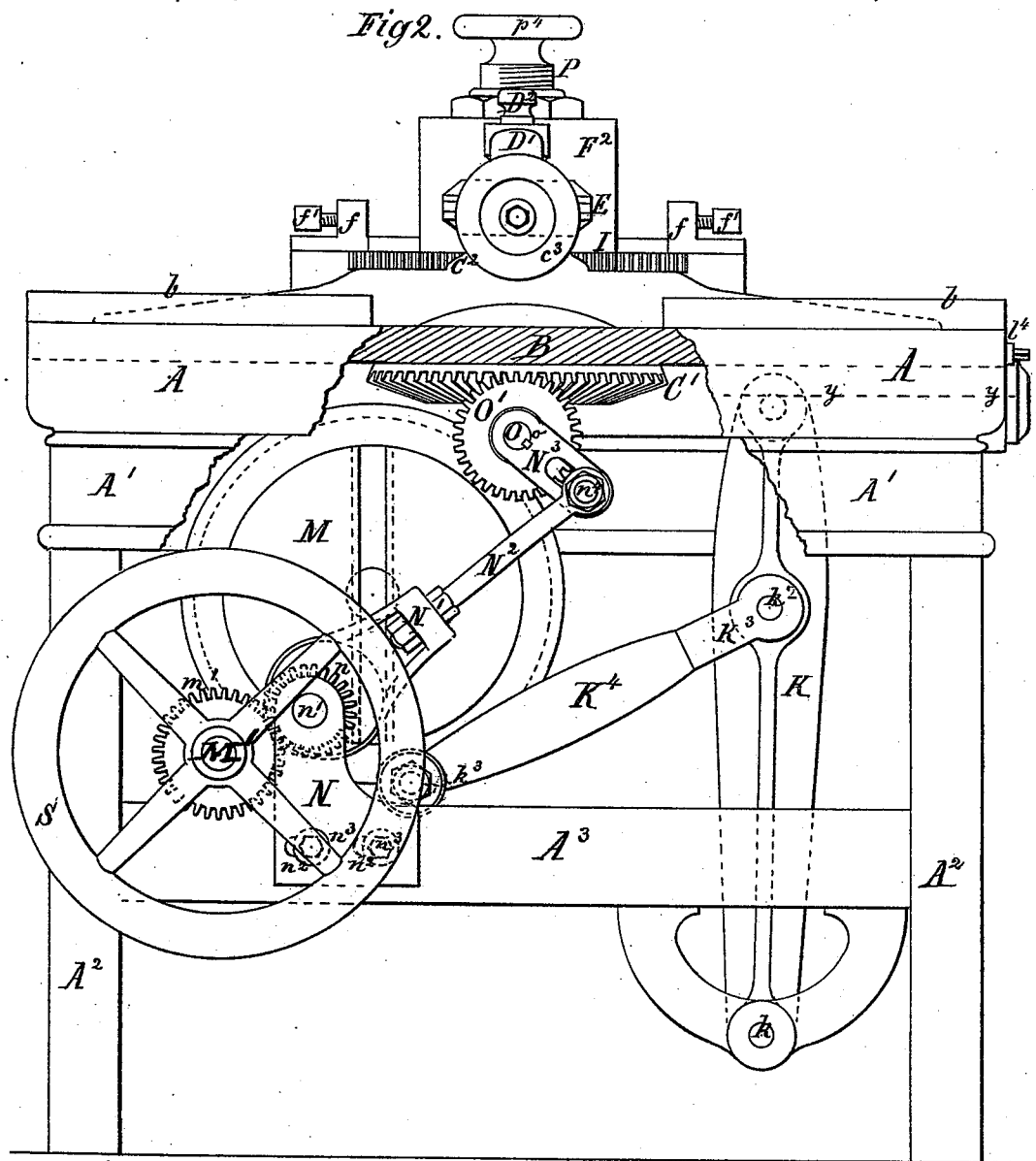
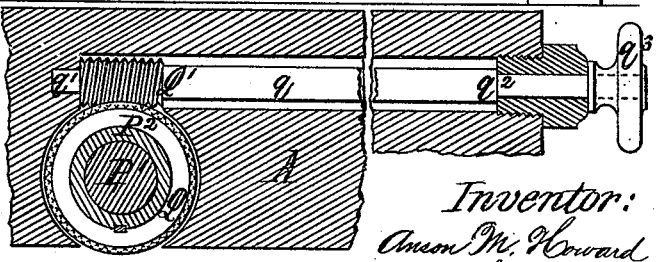

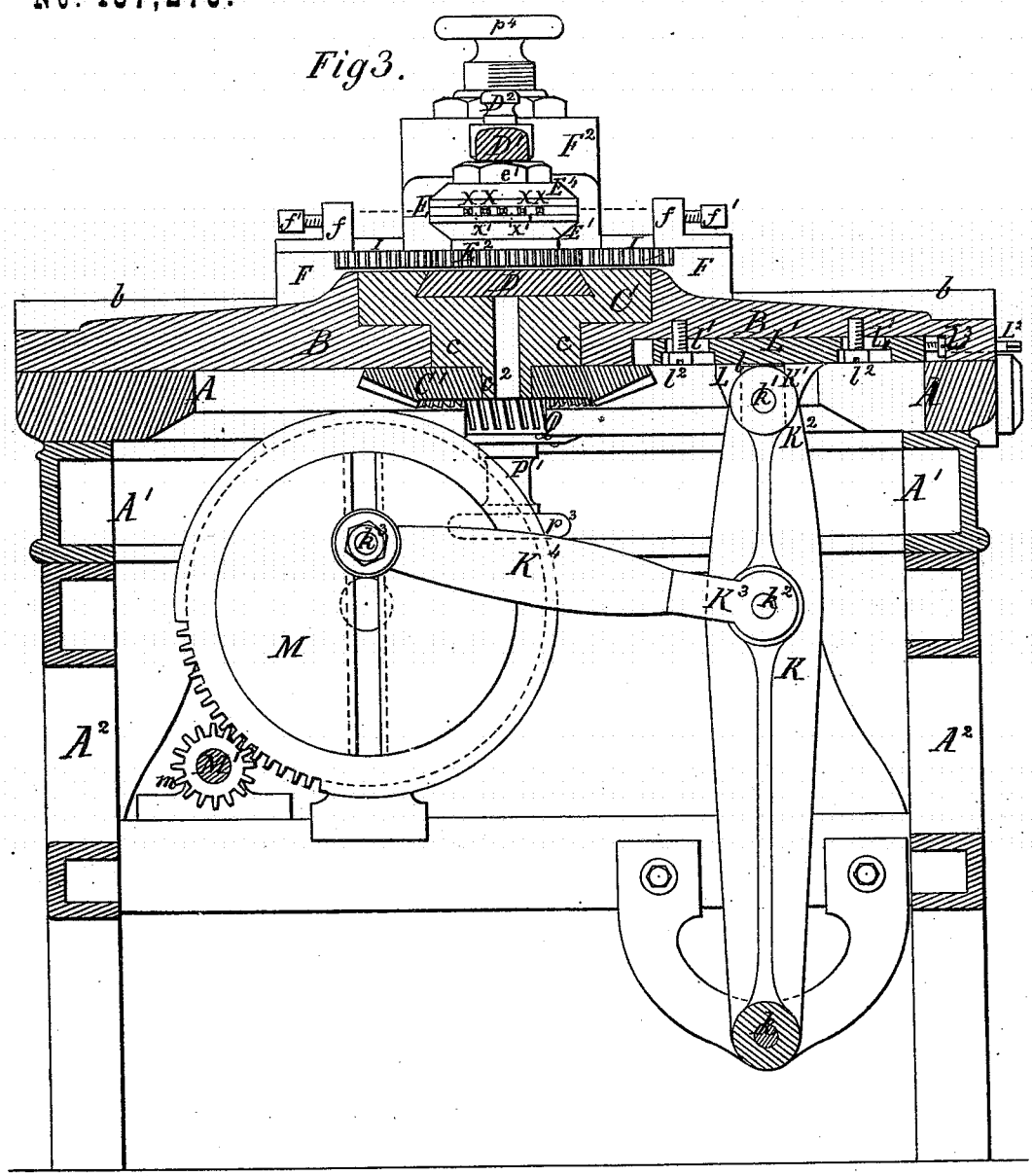
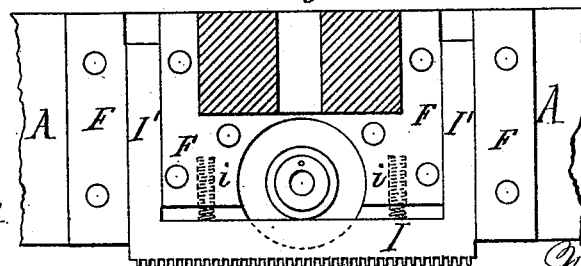

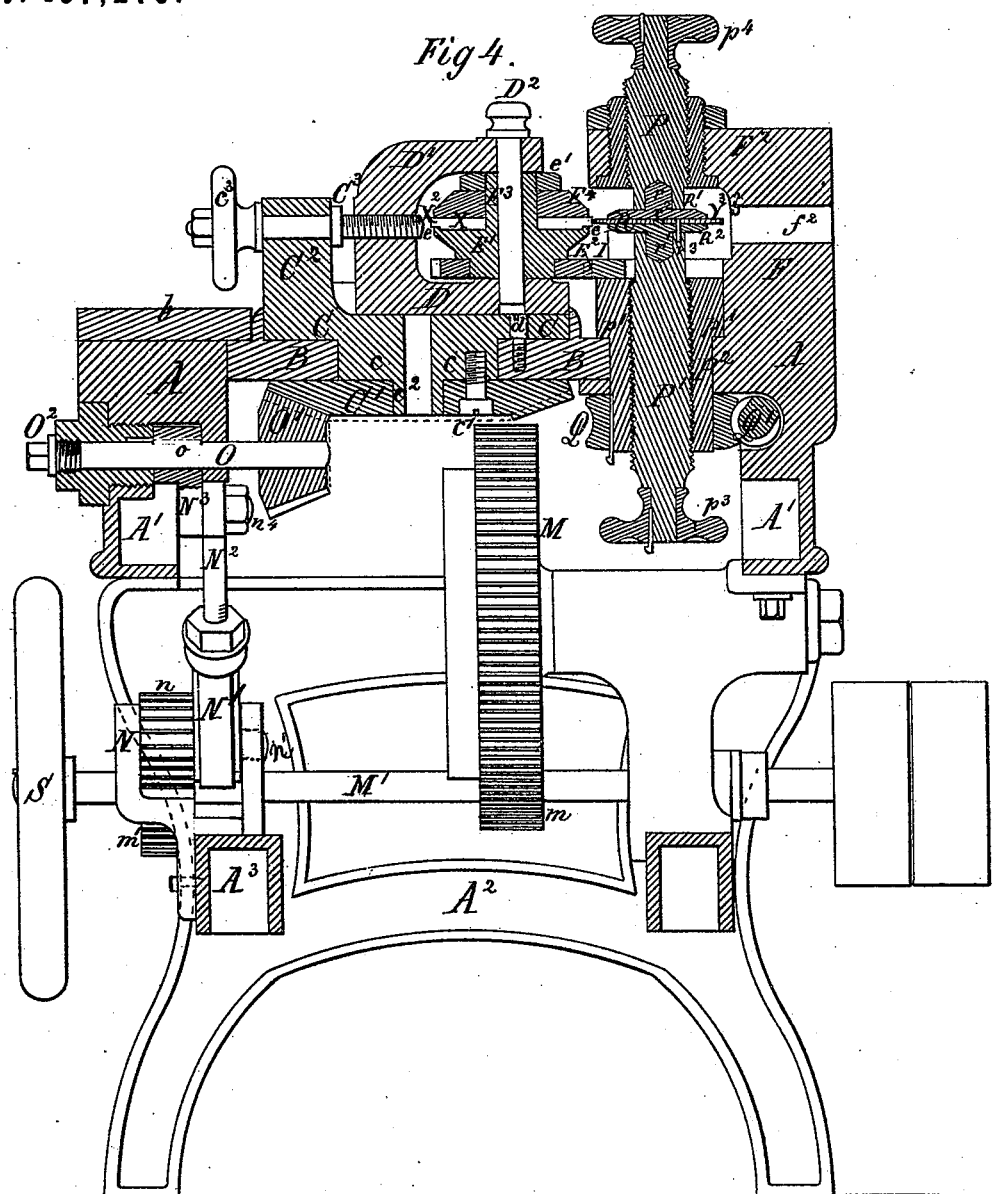

5 Sheets—Sheet 5.

A. M. HOWARD.
TYPE MACHINE.

No. 187,278. Patented Feb. 13, 1877.

Witnesses:
James Martin Jr.
Herman Kuoch.

Inventor:
Anson M. Howard
by
Mason, Fenwick & Lawrence

UNITED STATES PATENT OFFICE.

ANSON M. HOWARD, OF ILION, NEW YORK.

IMPROVEMENT IN TYPE-MACHINES.

Specification forming part of Letters Patent No. 187,278, dated February 13, 1877; application filed December 2, 1876.

*To all whom it may concern:*

Be it known that I, ANSON MERRICK HOWARD, of Ilion, in the county of Herkimer and State of New York, have invented a new and useful Improvement in Machines for the Manufacture of Hard-Metal Type, which improvement is fully set forth in the following specification, reference being had to the accompanying drawings, in which—

Figure 5:
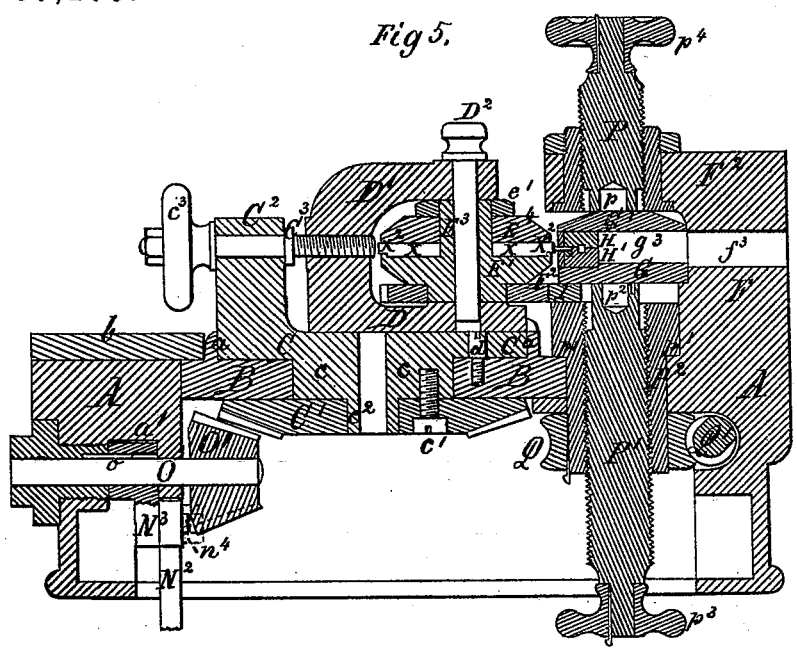
Figure 6:
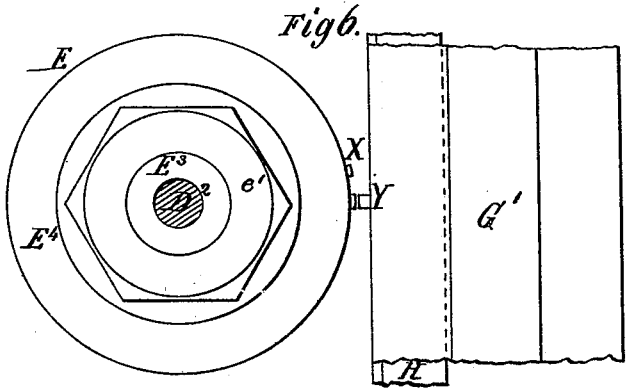
Figure 7:
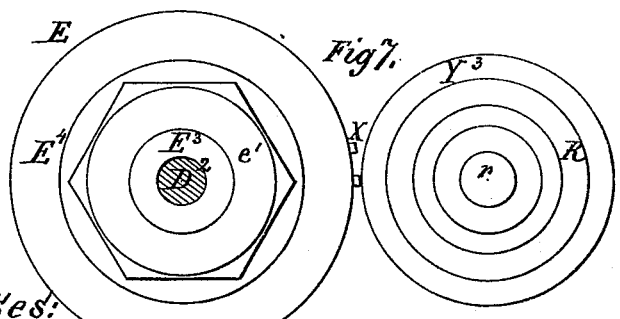

Figure 1 is a top view of my improved type-machine with a portion of the bed-plate broken out. Fig. 2 is a side elevation of the same with a portion of the frame broken out. Fig. 3 is a vertical central longitudinal section of the same. Fig. 4 is a vertical central cross-section of the same. Fig. 5 is a similar cross-section, illustrating the manufacture of straight type. Fig. 6 is an enlarged top view of the type-wheel and the straight-type clamp. Fig. 7 is an enlarged top view of the type-wheel and the clamp for holding segmental type-blanks. Fig. 8 is a front elevation of the straight-type clamp. Fig. 9 is a cross-section in the line $x\,x$ of the same. Fig. 10 is a top view of the same with the cap removed. Fig. 11 is an elevation of the type-rack. Fig. 12 is a top view of a plate type-holder. Fig. 13 is a section in the line $x^1\,x^1$ of the same. Fig. 14 is a front view of the same. Fig. 15 is an enlarged front view of the type-holder, partly sectioned. Fig. 16 is a cross-section in the line $x^2\,x^2$ of the same. Fig. 17 is a cross-section in the line $x^3\,x^3$ of the same. Fig. 18 is a cross-section of a type-rack for twin types. Fig. 19 is an enlarged elevation of a twin type. Fig. 20 is a top view of the main part of the type-wheel. Fig. 21 is a horizontal section through the rear part of the frame in the line $y\,y$ of Fig. 2. Fig. 22 is a top view of the rack which operates the type-wheel. Fig. 23 is a top view of a modification of the type-wheel and type-rack. Fig. 24 is an elevation of a portion of the said modified clamp, and Fig. 25 is a central cross-section in the line $z\,z$ of Fig. 23.

The nature of my invention consists in certain constructions, combinations, and arrangements of parts, as will be hereinafter described and specifically claimed, whereby a machine is produced which reproduces from original type prepared for the purpose hard-metal type of two kinds, elevated or depressed, and with straight, concave, or convex surfaces.

The object of my invention is to make very accurate duplicate hard-metal type in shorter time than they can be made by hand, for which purpose I prepare an original set of type for each different style and size, which type are made of hardened steel or other metal or alloy sufficiently hard, or capable of being sufficiently hardened by artificial means, and reproduce the same with the aid of my machine upon similar or other metal by means of pressure applied alternately in opposite directions.

In the drawings, A represents a platform supported by a horizontal frame, $A^1$, and legs $A^2$. The platform A supports a longitudinal slide, B, in a suitable depression, which slide is held in place by gibs $b$, with set-screws $b^1$. A disk, C, is inserted into a central bearing, $a$, of the slide B. A concentric step, $c$, of the said disk is fitted into the slide B, and made flush with its bottom. Upon the bottom of the step $c$ a bevel-wheel, $C^1$, is fastened by means of screws $c^1$, Fig. 4, and kept concentric by means of a cylindrical projection, $c^2$. A set-screw, $d$, serves to rigidly connect the disk C and the slide B, when so desired.

A slide, D, is secured to the disk C by means of a dovetail fit, and operated by means of a feed-screw, $C^3$, attached to a lug, $C^2$, on the disk C. The threaded end of said feed-screw is screwed into a curved arm, $D^1$, of the slide D, and is provided with a hand-wheel, $c^3$. The arm $D^1$ and the slide D are provided with a vertical central arbor, $D^2$, upon which a type-wheel, E, is revolved, which is inserted between the arm $D^1$ and the slide D. The wheel E is of the same construction as that in a type-machine formerly invented by me, and patented November 9, 1875, and consists of a disk, $E^1$, with a gear-wheel, $E^2$, a stepped rim, $e$, and a tube, $E^3$, upon which a washer, $E^4$, is fitted and fastened by means of a nut, $e'$. Between the washer $E^4$ and the disk $E^1$ the original types X are clamped in radial arrangement, and held in place partly by interposed wedge-shaped spaces $X^1$, and by reductions $X^2$, fitting upon the stepped rim $e$. Opposite the wheel E the platform A is provided with an oblong projection, F, upon which the lower part G of a type-clamp for the blank types is fastened by means of set-screws, $g^1$. The upper part $G^1$ of the said type clamp is fastened down upon the lower part G by means of set-screws $g^1$, as in Figs. 8 and 9. Between the said lower and upper parts G $G^1$, in a suitable recess, $G^2$, the type-rack, consisting of two matched linings, H $H^1$, is inserted. Each of the linings is provided with a face-plate, $h$, of hardened metal, rigidly fastened thereto by means of pins or screws $h^1$. (Shown in Figs. 16 and 17.) Behind the upper face-plate $h$ the lining H is provided with a downward-projecting rib, $h^2$, which fits into a corresponding groove, $h^3$, in the lining $H^1$. Near or at the center the said linings are provided with a longitudinal hole, $H^2$, formed partly in each lining, into which a slender wedge is introduced, for the purpose of prying the said linings apart, as they are very tightly fitted together. A couple of steady-pins, $h^4$, prevent longitudinal disarrangement of the said halves when closed. The upper face-plate $h$ is provided with square or oblong notches $h^5$, into which the type-blanks Y are inserted. The type-blanks Y are provided with cylindrical reductions $Y^1$, which are fitted into corresponding holes $h^6$ in the rib $h^2$ of the lining $H^1$. To facilitate the removal from or the insertion into the clamp G $G^1$ of the lining, the lower part G is provided with springs $g^2$, Fig. 9, in suitable sockets, whereby the top part $G^1$ is pushed upwardly as soon as the set-screws $g^1$ are slackened.

Below the clamp G $G^1$, as in Figs. 1, 3, and 22, a toothed rack, I, with two parallel guide-arms, I', is inserted into suitable bearings into the projection F. A number of springs, $i$, in sockets, or otherwise secured to the projection F, serve to push the rack I against the wheel $E^2$, so that both are continually in gear, thereby preventing the disarrangement of the original and the blank types during the operation of reproducing.

To effect longitudinal adjustment between the original and blank types, as will sometimes be necessary before and during the operation of reproducing type, the plates $F^1$ which cover the rack I are provided with lugs $f$, and set-screws $f'$, whereby the the linings H $H^1$ may be slightly moved in the clamp G $G^1$, for which purpose the said linings are a little shorter than the clamp.

For a more complicated type, as at Y, (shown in Figs. 18 and 19,) the rib $h^2$ in the upper lining may be omitted, and the round shank $Y^1$ or cylindrical reduction, as in Fig. 16, is then embedded half in the upper and half in the lower lining, as shown in Fig. 18. In this case the shape of the type is sufficient to secure a good fastening between the linings, and it makes a tight fit of the reduction $Y^1$ in solid metal dispensable.

If typical impressions are to be made upon a plate, such plate $Y^2$ is fitted into a depression of a slide, J, and held in place by a pin, $j$. The slide J is fitted into the flaring face $J^1$ of a solid lining, $J^2$, and prevented from moving longitudinally by a set-screw, $j^2$. The said set-screw $j^2$ serves for general adjustment of very long plates or strips $Y^2$, upon which the printing or copying must necessarily be done in sections, while the set-screws $f^1$ are still used upon the part $J^2$ for the microscopic adjustment, which is, in this case, especially necessary, as the plate $Y^2$ is continually stretched by the operation of copying. The reciprocating motion of the slide B is effected by a lever-arm, K, with a rigid fulcrum, $k$, and a vertically-sliding pivot-head, $K^1$, in conjunction with an adjustable slotted head, L, on the lower side of the slide B. The head $K^1$ is attached by a pivot-pin, $k^1$, to the upper forked end $K^2$ of the lever-arm K, and is fitted into a vertical slot, $l$, in a head or lug, L, on a slide, $L^1$, which is fitted into a depression in the lower side of the slide B. The slide $L^1$ is provided with longitudinal slots $l^1$ and set-screws $l^2$, whereby it may be longitudinally adjusted on the slide B. To avoid loss of time, and otherwise facilitate the said adjustment, two bolts, $L^2 L^3$, are passed through the end of the slide B, of which the one, $L^2$, has a collar, $l^3$, opposite the slide $L^1$, and the other, $L^3$, has a collar, $l^4$, at the outer end of the slide B. The said bolts are, at their inner ends, provided with screw-threads and passed into the slide $L^1$. This construction and arrangement enable the operator to adjust the slide $L^1$ by turning the screws $L^2 L^3$ in the same direction, and to lock the said slide by turning the said screws in different directions. The said screws $L^2 L^3$ being easily accessible, the operator can adjust and, at the same time, observe the effect upon the situation of the operating type in a very short time, and without assistance. Below the pin $k^1$ the lever-arm K is provided with another pin, $k^2$, to which the forked head $K^3$ of a connecting-rod, $K^4$, is pivoted. The other end of the said rod $K^4$ is, by means of an adjustable pivot, $k^3$, of ordinary construction, connected to a transversely T-grooved wheel, M, which is revolved by a pinion, $m$, upon the driving-shaft $M^1$ of the machine. As in other similar constructions, the stroke of the slide B depends upon the distance of the pivot $k^3$ from the center of the wheel M. The shaft $M^1$ is provided with another pinion, $m^1$, which drives another pinion, $n$, upon a shaft, $n^1$, which is supported by an adjustable bearing, N. The bearing N is fastened by means of slots $n^2$ and set-screws $n^3$ to a horizontal bar, $A^3$, which connects the legs $A^2$ of the machine. To the pinion $n$ an eccentric, $N^1$, is fastened, the rod $N^2$ of which is attached to an adjustable pivot, $n^4$, of ordinary construction, on a slotted lever, $N^3$. The lever $N^3$ is fitted upon a shaft, O, and operates the same by means of a key, $o$, fastened to the said shaft, which is made to slide longitudinally through the said lever $N^3$ and its bearings in the frame $A^1$. The lever $N^3$ is inserted into a recess, $a^1$, of the platform A, to prevent it from moving longitudinally. The free end of the shaft O is provided with a beveled wheel, $O^1$, which, when the shaft O is pushed inwardly, gears into the wheel $C^1$ and causes the same to oscillate after the screw $d$ has been removed. For the latter purpose the slide B must be in a central position and stationary, and the connection-rod $K^4$ disconnected from the wheel M, as shown in Fig. 2. To keep the shaft O from sliding back from the wheel $C^1$, on account of the sideward pressure caused by the operation of the beveled wheels, a set-screw, $O^2$, is screwed into the frame $A^1$, which bears against the end of the shaft O, and so keeps it in position. When the slide B is to be operated, the shaft O is pushed outwardly and the bevel-wheel $O^1$ removed from the bevel wheel $C^1$, and the bearing N is removed from the shaft $M^1$, thereby disconnecting the wheels $m^1$ $n^1$.

The projection F is provided with an elbow, $F^2$, at the back of the machine, through the top of which a vertical screw, P, with a spindle-bearing, $p$, at its foot, is passed. Below the said screw P, and in line with it, is another similar screw, $P^1$, passed through tubular nut $P^2$, in the platform A. The tube $P^2$ has a step or collar, $p^1$, embedded in the projection F, and a worm-wheel, Q, fastened to its lower end, which worm-wheel is operated by a screw, $Q^1$, on a rod, $q$, shown in Fig. 21. A stepped end bearing, $q^1$, at one side, and a shoulder, $q^2$, at the other side, of the said screw, prevent longitudinal disarrangement of the same, while a hand-wheel, $q^3$, enables the operator to turn it. The upper end of the screw $P^1$ is provided with a spindle socket-bearing, $p^2$, and its lower end with a hand-wheel, $p^3$. A similar hand-wheel, $p^4$, is fastened to the upper end of the screw P, and a similar socket-bearing formed in it. Between the screws P $P^1$ a clamp-wheel, R, consisting of two disks, $R^1$ $R^2$, is inserted after the clamp G $G^1$ is removed. The disk $R^1$ has a shank, $r$, conforming in shape with its bearing $p$, in the screw P. The disk $R^2$ has a shank, $r^1$, fitting the bearing $p^2$, a central pin, $r^2$, passing into the disk $R^1$, and a pin, $r^3$, projecting above the said disk and below it into the screw $P^1$. Between the disks $R^1$ $R^2$ the plate or disk $Y^3$ is inserted, the pins $r^2$ $r^3$ passing through it, and thus coupling it with the lower disk $R^2$ and the screw $P^1$, so that the turning of the worm-wheel Q causes the disk $Y^3$ to revolve. The reproduction or copying of type upon the cylindrical surface of the disk $Y^3$ requires a greater oscillation of the type wheel E, which is effected by swinging the arbor $D^2$ by means of the wheel $C^1$, as aforesaid. The extreme edges of the original type are thereby perfectly reproduced. The larger the diameter of the disk $Y^3$, the further the wheel E must be moved back, and the nearer toward the center of the disk C, and consequently the less oscillation the arbor $D^2$ will receive, and the less the wheel E will swing; and therefore the impressions upon a disk, $Y^3$, differ from those upon a disk of smaller diameter, but they are always in conformity and corresponding with the curvature of the type-wheel E. The clamp G, Fig. 8, is provided with a transverse slot, $g^3$, which serves to receive the shank of a larger type-blank, the head of which is clamped in the recess $G^2$ after the linings are removed, and a hole, $f^2$, through the arm $F^2$, enables the operator to remove the said type-blank by driving it out from the rear by means of a drift and hammer. A hand-wheel, S, on the driving-shaft $M^1$, serves to aid the operator in getting the machine ready for operation.

Operation: The straight type-blanks are inserted into the linings H $H^1$, and these placed into the recess $G^2$ of the clamp G, which is fastened upon the projection F. The upper part $G^1$ is then screwed down upon the linings and the set-screws $f'$ screwed upon their ends. The wheel E is now supplied with the original hardened types, and inserted between the arm $D'$ and slide D, taking care that the wheel E and rack I are so meshed as to bring the two kinds of type as exactly opposite as possible. The remaining difference is corrected by the longitudinal adjustment of the linings H $H^1$, by means of the set-screws $f'$. The operator then adjusts the stroke of the slide B by means of the set-screws $L^2$ $L^3$, and finally sets the machine in motion. The slide B is moved backward and forward, the wheel E oscillates back and forward, and is, by means of the feed-screw $C^3$, moved toward the clamp G $G^1$. The types X are thereby forced against the ends of the blanks Y in varying directions, and the metal of the blanks is by degrees thereby swaged into the desired form. The machine works very rapidly, and the reproduced types are quickly made, requiring no finishing-touch by the hands of the engraver, and are, for most uses, of proper hardness when delivered from the machine.

The operation of copying or reproducing type upon a disk is, in principle, the same as that just described; but, as the means are different, the machine is differently adjusted. The clamp G $G^1$ is first removed, the connecting-rod $K^4$ is disconnected from the wheel M, the bearing N is so adjusted that the wheels $m^1$ and $n$ gear into each other, the shaft O is adjusted by means of the screw $O^2$, so the wheels $O^1$ and $C^1$ gear into each other, and the slide B is fastened in a central position by screwing the plates or gibs $b$ hard down upon it. The clamp-wheel R, with a cylindrical or segmental type-blank, $Y^3$, is then fastened between the screws P $P^1$ at the proper height, and the machine is started.

The operation then goes on in the manner already described, and after one type is finished the machine is stopped to be reset for the reproducing another type upon the blank $Y^3$. For this purpose the wheel $E^2$ is, by means of the set-screw $C^3$, moved back as far as possible, and the rack I is pushed off and out of gear, and the next original type turned in front, whereupon the blank $Y^3$ is, by means of the screw $Q'$ and the worm-wheel Q, turned in the right position, and the next type is then produced, and so on. In this case the type reproduced upon the blank Y³ may be made in any order of succession, and at any distance apart, irrespective of the arrangement of the original types in the type-wheel.

In Fig. 23, a type-wheel, E, is shown with cogs upon its rim and with types inserted in the said cogs. It gears into a type-rack, H, which is provided with parallel side cogs, between which the blank-types are inserted. The parallel sides of the said cogs prevent lost motion between the type-wheel and type-rack when they are not close together, as well as when they are close together. The illustrations, by elevation of Fig. 24 and by central and cross-section of Fig. 25, are easily understood.

Having described my invention, what I claim as new, and desire to secure by Letters Patent, is—

1. The combination, in one machine, of a separate holder for type metal of curved form, and a separate holder for type metal of a straight form, the reproducing type-wheel and suitable gearing and connections for operating said wheel in connection with each of the said type-holders, as occasion requires, substantially as and for the purpose set forth.

2. The reciprocating slide B, in combination with an oscillating clamp type-wheel, E, and a stationary type-clamp, H H¹, substantially as set forth.

3. The combination of an oscillating clamp type-wheel, E, having an arbor, D², which is on an oscillating support, and a stationary clamp for a type-blank, Y³, substantially as set forth.

4. The slide B, in combination with the slotted head L, and slide L¹, having screws L² L³, substantially as set forth.

5. The combination of a type-metal clamp, type-wheel slide B, lever K, connecting-rod K⁴, and the transversely-grooved crank-wheel M, substantially as set forth.

6. The slide B, in combination with the disk C, bevel-wheel C¹, slide D, feed-screw C³, and type-wheel E, substantially as set forth.

7. The type-rack H H¹, in combination with the set-screws $ff'$, substantially as set forth.

8. The combination of the type-rack H H¹, and the clamp G G¹, substantially as set forth.

9. The clamp G G¹, having a recess, G², a transverse slot, $g^3$, and springs $g^2$, substantially as set forth.

10. The type-rack, consisting of linings H H¹, having face-plates $h$, of hardened metal, and steady-pins $h^4$, substantially as set forth.

11. The disk C, having a wheel, C¹, in combination with the shaft O, having a wheel, O¹, and a lever-arm, N³, the connecting-rod N², and the eccentric N¹, substantially as set forth.

12. The combination of the type-wheel, the slide B, the shaft M¹, and intermediate actuating mechanism, substantially as set forth.

13. The combination of the type-wheel, the wheel-arbor support C, wheel C¹, shaft M¹, and intermediate actuating mechanism, substantially as set forth.

14. The combination of the screws P P¹, the clamp-wheel R, the revolving tubular nut P², the worm-wheel Q, and screw Q¹, substantially as set forth.

15. The combination of the disk R¹, having a shank, $r$, the disk R², having a shank, $r^1$, and pins $r^2 r^3$, and the revolving screw P¹, substantially as set forth.

16. The combination of the clamp G G¹, having a recess, G², the linings H H¹, and the adjusting set-screws $f' f'$, substantially as and for the purpose set forth.

17. The combination of sliding shaft O, bevel-wheel O¹, the set-screw O², bevel-wheel C¹, and type-wheel-arbor support C, substantially as and for the purpose set forth.

Witness my hand in the matter of my application for a patent for an improved machine for the manufacture of hard-metal type this 27th day of December, 1876.

ANSON MERRICK HOWARD.

Witnesses:
  THOMAS K. G. WRIGHT,
  IRA D. HASKELL.